United States Patent
Wong

[19]

[11] Patent Number: 6,084,790
[45] Date of Patent: Jul. 4, 2000

[54] CIRCUIT TO ENSURE EQUAL CURRENT SHARING AND SWITCHING LOSSES BETWEEN PARALLEL POWER DEVICES

[75] Inventor: Man Chuen Wong, Wanchai, The Hong Kong Special Administrative Region of the People's Republic of China

[73] Assignee: Astec International Limited, Hong Kong, The Hong Kong Special Administrative Region of the People's Republic of China

[21] Appl. No.: 09/226,672

[22] Filed: Jan. 7, 1999

[51] Int. Cl.[7] ................................ G05F 1/40; H02M 7/00
[52] U.S. Cl. ................................ 363/71; 323/272
[58] Field of Search .................... 323/222, 271, 323/272; 363/65, 69, 70, 71, 78, 79, 97

[56] References Cited

U.S. PATENT DOCUMENTS

| | | |
|---|---|---|
| 3,699,358 | 10/1972 | Wilkinson . |
| 4,257,090 | 3/1981 | Kroger et al. ............................ 363/65 |
| 4,384,321 | 5/1983 | Rippel . |
| 4,567,379 | 1/1986 | Corey et al. . |
| 4,924,170 | 5/1990 | Henze ................................. 323/272 |
| 5,191,519 | 3/1993 | Kawakami ............................. 363/71 |
| 5,418,707 | 5/1995 | Shimer et al. ......................... 363/65 |
| 5,428,523 | 6/1995 | McDonnal ............................ 363/71 |
| 5,479,087 | 12/1995 | Wright ................................ 323/267 |
| 5,521,809 | 5/1996 | Ashley et al. ......................... 363/71 |
| 5,576,940 | 11/1996 | Steigerwald et al. ..................... 363/17 |
| 5,909,108 | 6/1999 | He et al. ............................. 323/222 |

OTHER PUBLICATIONS

"Static and Dynamic Behavior of Paralleled IGBTs," Romeo Letor, Advanced Application Engineer, Discrete & Standard ICs Group, SGS–Thomson Microelectronics. 1990 IEEE.

"Snubber Circuit and Mosfet Paralleling Considerations for High Power Boost–Based Power–Factor Correctors," A. Pietkiewicz and D. Tollik, Ascom Energy Systems, Ltd. 1995 IEEE.

*Primary Examiner*—Adolf Deneke Berhane
*Assistant Examiner*—Bao Q. Vu
*Attorney, Agent, or Firm*—Coudert Brothers

[57] ABSTRACT

A current sharing circuit has a plurality of power devices, such as diode rectifiers, connected in a parallel arrangement. Each leg of the parallel arrangement comprises one power device connected in series to an inductive element. The series resistance of the inductive element in each leg of the parallel circuit moderates the affect of temperature variations on the current drawn by each power device, which enables substantially equal current sharing to occur. As used in switch mode power supplies, such as forward converters and boost converters, the current sharing circuit provides the benefit of substantially equal current sharing between power devices without increasing resistive losses which would reduce the efficiency of the power supply.

13 Claims, 5 Drawing Sheets

CIRCUIT TO ENSURE EQUAL CURRENT SHARING AND SWITCHING LOSSES BETWEEN PARALLEL POWER DEVICES

FIELD OF THE INVENTION

The present invention relates to circuits to ensure equal current sharing and switching losses between power devices. More specifically, the present invention relates to circuits to ensure equal current sharing and switching losses between power devices, such as power switches or rectifier diodes, by coupling a separate inductor to each of the power devices.

BACKGROUND OF THE INVENTION

There is a need to increase the current switched through many semiconductor power supplies. A common practice in power electronics is to use a parallel arrangement of standard size power switching devices, such as bipolar transistors, field effect transistors (FETs), insulated field-effect transistors (IGFETs), and insulated gate bipolar transistors (IGBTs) instead of a single large power device, in order to handle the high current and power dissipation that may otherwise exceed the safety ratings of a single power switching device. Also, it is a common practice in power electronics to use a parallel arrangement of diode rectifiers to handle high currents that would otherwise exceed the safety ratings of a single diode rectifier.

The use of a parallel arrangement of standard size power devices is preferred over the alternative of using a single larger power device for the following reasons: (1) a parallel arrangement of standard size power devices is usually less expensive than a single high power device because standard size power devices are built in high quantities and sold at competitive prices whereas high power devices are made in smaller quantities and sold at less competitive prices; (2) smaller components tend to switch faster and more efficiently; (3) the packaging and thermal arrangement of standard size power devices is easier than for high power devices; and (4) an appropriate single high power device is sometimes not available.

Unfortunately, the use of parallel power devices has its own set of disadvantages. First, there is no guarantee of equal current sharing between the parallel power devices. To achieve the best performance and lowest temperature rise it is necessary that current be shared roughly equally between power devices coupled in parallel. As a result, larger power rated devices need to be used in order to provide a sufficient operating safety margin. Second, when two or more parallel power devices are switched, the power device that turns on the fastest will absorb all of the turn-on losses. Similarly, the power device that turns off the slowest will absorb all of the turn-off losses. Therefore, the switching loss, both turn-on and turn-off, is not shared equally among the parallel power devices and, consequently, there is a higher power dissipation in individual power devices. Third, in the case of power rectifier devices, such as silicon and Schottky diodes, which have a forward voltage with a negative temperature coefficient, it is fairly easy for one of the paralleled rectifiers to go into thermal runaway.

FIG. 1 shows a schematic diagram of a prior art boost power converter 100 using FETs as parallel power switching devices and parallel diode rectifiers to provide a circuit that will handle high currents that would exceed the safety ratings of a boost converter that used only a single switch and a single diode rectifier. Voltage $V_{in}$ is input into boost converter 100 at input terminals 102. The input voltage $V_{in}$ is then boosted by inductor 104 and an output voltage $V_{out}$ is output at output terminals 103 by way of output capacitor 114. Boost converter 100 preferably uses two FET power switches 106 and 108. A pulsed signal source 101 is used to drive the switches 106, 108. In switches 106, 108, the load current in each switch will depend on the channel resistance of the FET. Consequently, for similar FETs, current will be shared reasonably well when these devices are connected in parallel. As shown in FIG. 1, additional protective resistors, R, are preferably used to couple the gates of switches 106, 108 to signal source 101 in accord with common circuit practice. Two diode rectifiers 110 and 112 connected in parallel are also used.

A key limitation to using parallel diodes 110, 112, and to a lesser extent FET switches 106 and 108, is that equal current sharing typically does not occur. One of the two devices will tend to draw substantially more current than the other. Consequently, the circuit designer must design the parallel switches or diodes assuming a large variation in nominal current, i.e., the circuit designer must assume that each of the two power device draws 50%±X%, of the total current where X accounts for the fact that unequal current sharing occurs. For example, one device may draw 66% of the current and the other 34% of the current. If X is large, the circuit designer will be forced to use larger current value diodes or transistors than if substantially equal current sharing were enabled. Alternatively, the designer may be forced to limit the maximum current to less than what would be possible if substantially equal current sharing occurred.

One reason why equal current sharing does not occur between parallel diodes 110, 112 or parallel switches 106, 108 is that there are inherent manufacturing tolerances associated with each device. For example, typically the turn-on voltage and forward resistance of two diode rectifiers varies by at least several percent. Consequently, even though the same voltage is applied across parallel diodes 110, 112, different currents will flow through each diode 110, 112. Similarly, there are slight manufacturing variations in the source-to-drain channel resistance of FET switches 106, 108.

In many cases, thermal affects exacerbate inherent manufacturing variations. Semiconductor devices have current-voltage characteristics that are temperature dependent. For example, if there are slight variances in the current-voltage characteristics of parallel diodes 110, 112 one of the diodes will draw slightly more current than the other. The diode that draws the largest current, i.e., the one with the lowest turn-on voltage and on-resistance, will tend to operate at a higher temperature. However, the turn-on voltage and forward resistance of a diode rectifier decreases with temperature. Device heating will thus tend to exacerbate initial manufacturing variances in a diode's current-voltage characteristics, with the unwanted result of thermal runaway as most of the current gets diverted through the dominant diode.

A further reason why equal current sharing does not occur is that parallel devices may not switch perfectly in phase. There is a manufacturing tolerance associated with the inductance and capacitance of each switching device. Moreover, there are manufacturing tolerances associated with the packaging elements used to interconnect individual switching devices to a signal source. Consequently, while switches 106, 108 may be driven substantially in phase by the same signal source, there may be slight differences in their actual turn-on and turn-off responses. Consequently one device may absorb a disproportionate share of the turn-on or turn-off switching losses.

The problems associated with the switches 106, 108 of FIG. 1 are exacerbated when bipolar transistors are used instead of FETs for these switches. For example, as shown in FIG. 2, two bipolar switches 116, 118 may be used as parallel switches. However, bipolar transistors have nonlinear voltage/current characteristics and a negative temperature coefficient of "on" voltage. It is therefore common practice to insert an additional resistor 120, 122 in series with respective emitter terminals of transistors 116, 118 to reduce the effect of variations in the current-voltage characteristics of each transistor in order to prevent one transistor from drawing substantially more current than the other one. This increases component count, circuit size, and cost. Similarly, as shown in FIG. 3, two parallel rectifiers 124, 126 may have resistors 128, 130 in series with each individual diode. Still another prior art approach, as shown in FIG. 4, is to drive parallel diodes 132, 134 from secondary windings 142, 144 driven by primary winding 139 of transformer 140. The resistance of windings 142, 144 and resistors 136, 138 helps to ensure substantially equal current sharing. However, the additional resistance of resistors 120, 122, 128, 130, 136, 138 in the above-described circuits significantly reduces the efficiency of a power converter. For example, in the embodiment of FIG. 3, selecting the nominal resistance of resistors 128, 130 to be about four times the equivalent series resistance of diodes 124, 126 increases the resistive power losses by a factor of five compared to the use of diodes 124, 126 without resistors 128, 130.

There are a number of prior art circuits designed to provide equal current sharing and switching losses between power devices. U.S. Pat. No. 3,699,358 issued to Wilkinson ("Wilkinson") and U.S. Pat. No. 4,567,739 issued to Corey, et al., ("Corey, et al.") disclose the use of current transformers coupled to power switching devices. In a typical configuration, the transformer winding is coupled to either the emitter of a bipolar transistor or the source of a FET switch to force equal current sharing between the FET switches. The use of the additional transformers in Wilkinson and Corey, et al., adds significantly to the cost and size of their power converters. Also, at high switching frequencies, e.g., greater than 100 kHz, commonly used in many modem power converters, there are significant energy losses in the transformers, which further reduces the efficiency of the power converters.

Another prior art technique for providing equal current sharing and switching losses involves using "matched" power devices with similar specifications, such as FETs with similar drain to source resistance, $R_{sd}$, or diodes with similar forward voltages. However, matched power devices are typically expensive, since numerous power devices must be tested and sorted in order to achieve a small subset of devices with substantially similar current-voltage characteristics. The prior art also discloses carefully balancing the printed circuit board (PCB) layouts to make the track resistance and inductance for each of the parallel power devices similar. This further equalizes current sharing and switching losses between parallel power devices. However, this technique also may lead to increased circuit cost.

While matching device characteristics and printed circuit board layouts does tend to improve current sharing, matching techniques do not guarantee current sharing is achieved so as to eliminate the possibility of thermal runaway of one of the parallel matched devices, especially at high current levels. At high current levels, each power device dissipates a substantial amount of power. Consequently, there is an increased possibility of substantial temperature increases in a power device operating at such current levels. As mentioned above, the inherent instability in high current, high power semiconductor devices results from the forward voltage negative temperature coefficient of certain power devices, such as silicon and Schottky diodes and bipolar transistors. Thus, if two or more power devices are coupled in parallel, then more current will flow through the power device having the lower forward voltage than through the power device(s) having the higher forward voltage. Also, the temperature rise of an individual power device will depend both upon its power dissipation and upon how it is thermally coupled to other elements. The device with the lowest forward voltage will tend to draw more current and operate at a slightly elevated temperature compared to other diodes. However, this will further lower its forward voltage and series resistance, leading it to draw more current as it heats. Since the power device has a forward voltage negative temperature coefficient, the temperature of the power device is fed back in a positive feedback loop that causes the current through the power device to increase further, ultimately causing thermal runaway of the power device.

Another prior art technique for providing equal switching losses between parallel power devices involves adding individual snubbers, such as those containing an inductor and a capacitor, to each of the power devices. One such technique is described in an article by A. Piekiewicz and D. Tollik entitled "Snubber Circuit and MOSFET Paralleling Considerations For High Power Boost-Based Power-Factor Correctors", which is incorporated herein by reference. This techniques helps to equalize switching losses. It does not, however, ensure equal current sharing between the parallel power devices.

The prior art also teaches mounting the parallel power devices on a single heat sink to ensure that they operate at similar temperatures so as to prevent thermal runaway of the power devices. One such technique is described in an article by Romeo Letor entitled "Static and Dynamic Behaviour of Parallel IGBTs", which is incorporated herein by reference. This technique helps equalize the temperature at which the parallel devices operate. However, it does not ensure equal current sharing and switching losses between the power devices, as it does not ensure matching of the temperature of the parallel devices.

Generally, while there are many attempted approaches to improve current sharing between parallel switches or diodes, they suffer from numerous drawbacks. Many previous approaches substantially increase the cost, size or complexity of the total circuit.

Thus, it is desirable to provide a circuit that provides equal current sharing and dissipation losses among power devices connected in parallel without suffering from the various disadvantages associated with the above described prior art techniques designed to achieve the above-mentioned equalization.

SUMMARY OF THE INVENTION

The present invention is a circuit to ensure substantially equal current sharing between parallel power devices. Broadly stated, the present invention is a current sharing circuit comprising: a first voltage terminal; a second voltage terminal; N inductive elements having first and second terminals, where N is an integer greater than one; the first terminal of each of the N inductive elements connected to said first voltage terminal, each of the N inductive elements having a substantially similar impedance; a first set of N power devices each coupled between a respective one of the second terminals of a corresponding one of the N inductive elements and the second voltage terminal, each of the first set of N power devices having a conductive mode with substantially similar electrical characteristics wherein the set of N power devices are operated in phase so as to provide equal current sharing between the set of N power devices and further wherein the resistance of each of the inductive elements is substantially greater than the resistance of each said power device in its conductive mode.

A second embodiment of the present invention encompasses a current sharing circuit comprising: first and second input voltage terminals; first and second output voltage terminals; N inductive elements having first and second terminals, where N is an integer greater than one, the first terminal of each of said N inductive elements connected to said first input voltage terminal; a first set of N power devices each coupled between a respective one of said second terminals of a corresponding one of said N inductive elements and said first output voltage terminal; a second set of N power devices each coupled between a respective one of said second terminals of a corresponding one of said N inductive elements and said second input voltage; and means for coupling said second input voltage terminal to said second output voltage terminal; wherein said first set of N power devices are operated in phase so as to provide equal current sharing and switching losses between said first set of N power devices and further wherein said second set of N power devices are operated in phase so as to provide equal current sharing and switching losses between said second set of N power devices.

In a preferred embodiment, the resistance associated with each inductive element is greater than the equivalent resistance of each of the power devices in their conductive state.

In a preferred embodiment, the current sharing circuit of the present invention further comprises a magnetic core, wherein the N inductive elements are N inductors wound around said magnetic core.

In one embodiment of the current sharing circuit of present invention, the first and second sets of N power devices comprise first and second sets of N rectifiers, respectively.

In another embodiment of the current sharing circuit of present invention, the first set of N power devices comprises a first set of N rectifiers whereas the second set of N power devices comprises N power switches.

It is, therefore, an object of the present invention to provide equal current sharing between the power devices coupled in parallel in a circuit. Another object of the present invention is to reduce the possibility that any of the power devices in the circuit would undergo thermal runaway.

These and other objects and advantages of the present invention will become evident to those skilled in the art in view of the following description of the invention.

DETAILED DESCRIPTION OF THE INVENTION

The present invention generally comprises a parallel arrangement of power devices in an inventive current sharing circuit approach. In this application, power devices refers to semiconductor switches, such as bipolar transistors, field effect transistors (FETs), and other switches known in the art. However, power devices also include semiconductor rectifiers, such as Schotcky diodes and other semiconductor rectifiers known in the art.

The inventive current sharing circuit approach is of particular interest for switch mode power supplies, although it may have other applications as well. There are numerous switch-mode power supply topologies known by those of ordinary skill in the art of power electronics. However, numerous switch-mode power supply designs comprise a circuit leg comprising an inductor coupled to a first power device. Also, it is common to couple a second power device to the node between the inductor and the first power device.

Figure 5:
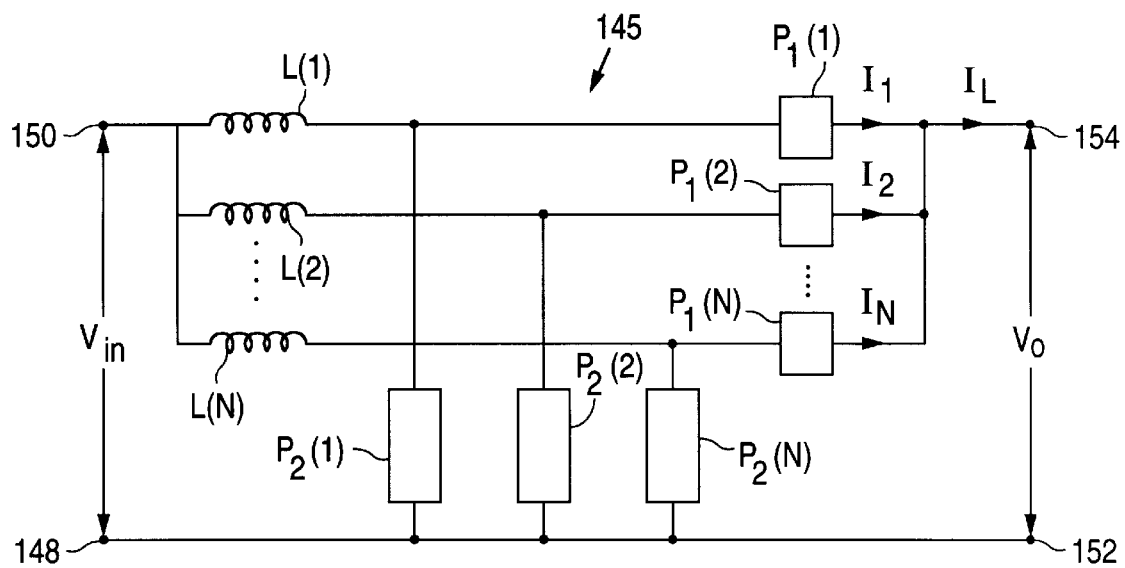
FIG. 5 is a circuit schematic of an inventive current sharing circuit.

The general principles of the present invention are illustrated in the inventive current sharing circuit 145 of FIG. 5. An input voltage, $V_{in}$, is coupled to input voltage terminals 148, 150. The current sharing circuit 145 has output voltage terminals 152, 154. A common ground is formed between input terminal 148 and output terminal 152. There are N inductive elements, L(1), L(2) . . . L(N), where N is an integer greater than one. As used in this application, an inductive element includes inductor coils, transformers, and other structures known by those of ordinary skill in the art which have an inductive impedance. There is a first set of N power devices, $P_1(1)$, $P_1(2)$ . . . $P_1(N)$. There is also a second set of N power devices, $P_2(1)$, $P_2(2)$ . . . $P_2(N)$. Each inductive element, L(i), has one lead connected to input terminal 150. The second lead of each inductive element, L(i), is coupled to output terminal 154 by a corresponding first power device, $P_1(i)$. The second lead of each inductive element, L(i), is also coupled to output terminal 152 by a corresponding second power device, $P_2(i)$.

The general principles of switch mode power supply design are well known. Typically, the two sets of power devices do not enter a conductive state at the same time. For example, the second set of power devices may comprise switches that are turned on and off on a periodic basis. During portions of time of the circuit operation when the second set of power devices are substantially non-conducting, the equivalent circuit will comprise a set of power devices and inductors arranged in parallel, as shown in FIG. 6.

The inventive current sharing circuit of FIG. 5 will tend to have substantially equal currents $I_1, I_2, \ldots I_N$, contributing to load current $I_L$ if the value of the impedance of inductive elements L(1), L(2) ... L(N) is selected to be substantially equal; the properties of the first set of switching devices, $P_1(1), P_1(2) \ldots P_1(N)$ are selected to be substantially identical; and the properties of the second set of power devices, $P_2(1), P_2(2) \ldots P_2(N)$ are selected to be substantially identical. However, the inventive current sharing circuit also benefits from the use of a plurality of inductors. As shown in FIG. 6, for the case that the second set of power devices is in a non-conducting mode, the currents through each of the first set of power devices, $P_1(1), P_1(2) \ldots P_1(N)$, will depend upon the voltage difference between the input and output terminal 150, 154. However, the inductive elements L(1), L(2) ... L(N) each have an associated resistance, R(1) ... R(N). The resistance of the conductor comprising an inductive element, such as the wire of an inductor coil, is somewhat less sensitive to temperature compared with common semiconductor devices. For example, the resistance of a copper wire changes by about thirty percent for a seventy degree Celsius change in operating temperature. While this is a significant change, it is dramatically less than the variation in resistance of diode rectifiers over a similar temperature range, since the current-voltage relationship of a diode rectifier is commonly modeled as increasing exponentially with increasing temperature (for a constant bias voltage and ignoring resistive effects). Consequently, slight manufacturing or thermal variations in the electrical characteristics (e.g., the on-resistance) of the power devices will have a reduced effect compared to the case where all of the power devices are coupled to one common inductor.

Figure 6:
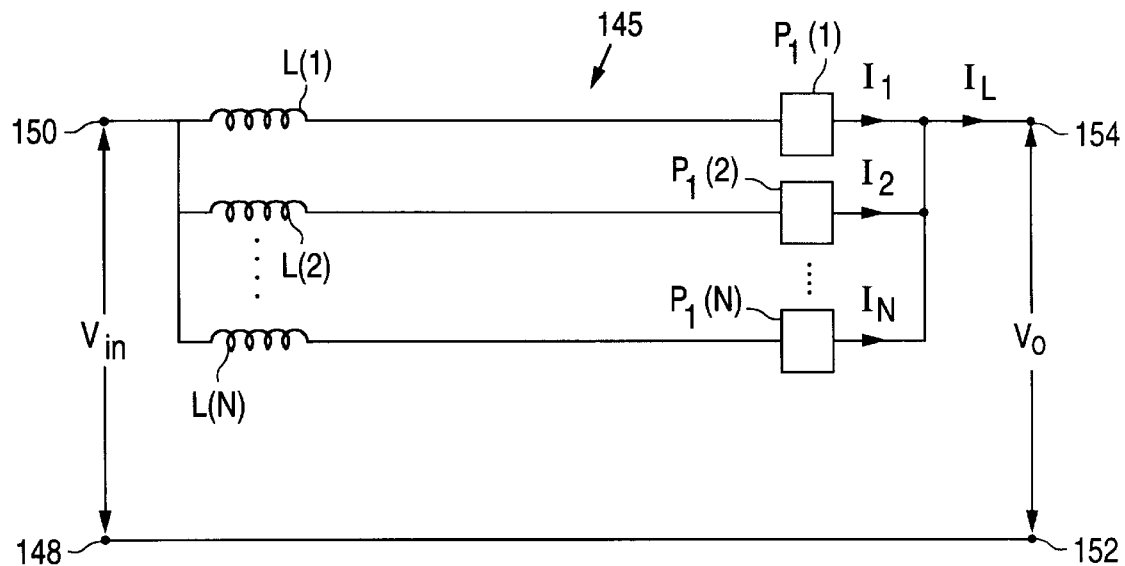
FIG. 6 is an equivalent circuit of the current sharing circuit of FIG. 5 with a second set of power devices in a non-conducting mode.

The circuit of FIG. 6 is, in a general sense, a building block upon which many variations of the present invention are possible. The present invention generally uses a parallel arrangement of power devices, each coupled by its own inductive element, to achieve an improvement in current sharing compared to directly combining the power devices in parallel. Since the total current is split between N inductive elements, the total resistive losses associated with the N inductive elements are $N(I_{total}/N)^2 R_L = (I_{total})^2 R_L/N$, where $I_{total}$ is the total input current and $R_L$ is the resistance of one inductive element. The total resistive losses associated with the N inductive elements is thus substantially less than for the case of one inductive element carrying the same current. For example, a current sharing circuit of the present invention with two inductive elements has one-half the associated resistance loss compared to a conventional circuit with one inductive element. The power conversion efficiency of the present invention is thus potentially quite high. By way of comparison, if additional resistors were used to moderate the behavior of the power devices, the power conversion efficiency of the circuit would significantly decrease.

Figure 7:
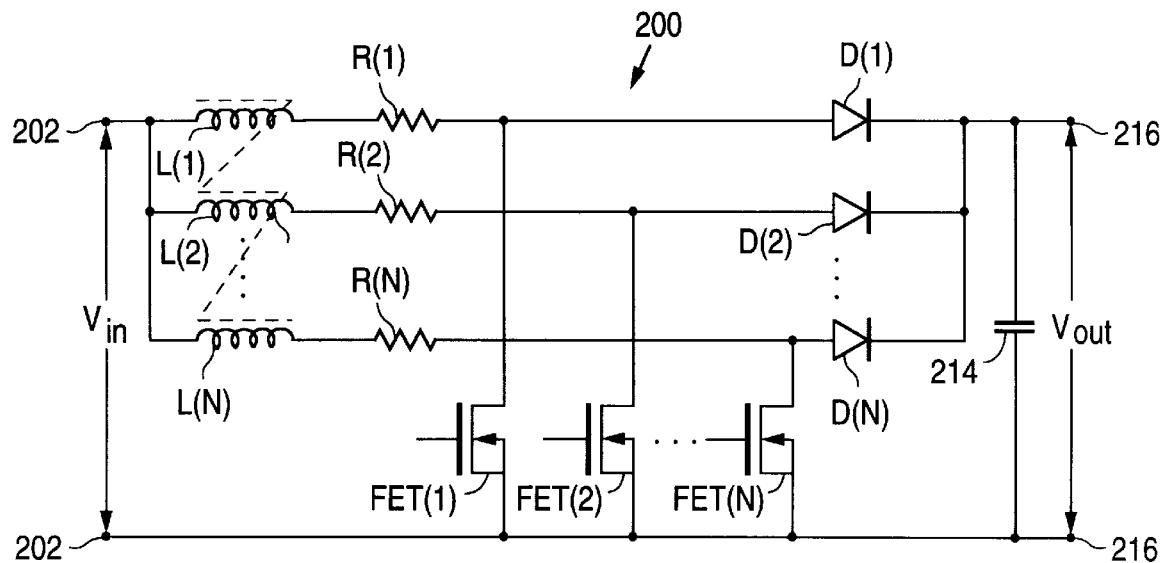
FIG. 7 in a circuit schematic of an inventive boost converter.

FIG. 7 shows a boost converter 200 using the current sharing approach of the present invention. An input voltage $V_{in}$ is applied to input terminals 202. Each inductive element of the boost converter is modeled as an ideal inductor L(i) that has an associate series resistance R(i). The input voltage increases in inductors L(1) to L(N). A smoothing capacitor 214 smooths the rectified output from diodes D(1) to D(N) across output terminals 216. In boost converter 200, a separate inductive element is coupled to each set of switch and diode. Inductor L(1) is coupled to diode D(1) and switch FET(1), while inductor L(2) is coupled to diode D(2) and switch FET(2) and inductor L(N) is coupled to diode D(N) and switch FET(N). N is an integer greater than one. Thus, boost converter 200 represents a generalized system having two or more of each, inductors, power switches and diodes.

The parallel components are preferably selected to have the same nominal characteristics, which is one factor which favors equal current sharing. It is preferable that each FET have the same nominal characteristics. Power switches FET (1) to FET(N) are driven substantially in phase. In other words they are turned ON and OFF substantially simultaneously. Inductive elements L(1) to L(N) preferably each have substantially equal inductances. Diodes D(1) to D(N) preferably have substantially equal current-voltage characteristics.

In a preferred embodiment, inductors L(1) to L(N) are inductors wound around a common magnetic core. A plurality of inductors wound around the same magnetic core may potentially occupy less space than a plurality of inductive elements with the same inductance and resistance wound around separate magnetic cores. This would occur, for example, if a common magnetic core occupied a smaller volume compared with a plurality of individual magnetic cores. Also, inductors wound around a common magnetic core are magnetically coupled to one another with a mutual inductance as in conventional transformer cores.

The inventive circuit design is tolerant to variations in semiconductor component characteristics. This is because each inductive element includes a corresponding series electrical resistance R(i). In the parallel arrangement of FIG. 7, each diode, D(1) to D(N) sees an associated inductor resistance R(1) to R(N) when its corresponding switch FET(1) to FET(N) is off. Similarly, each switch FET(1) to FET(N) sees an associated electrical series inductor resistance R(1) to R(N) when the switch is on. Preferably, the inductors have an associated electrical series resistance that is larger than the forward resistance of diodes D(1) to D(N). As an illustrative example, an inductive element with inductance L(1) with an electrical resistance R(1) about two times the nominal on-resistance of diode D(1) will reduce current variations associated with variances in the on-resistance of diode D(1) by about a factor of three.

Figure 8:
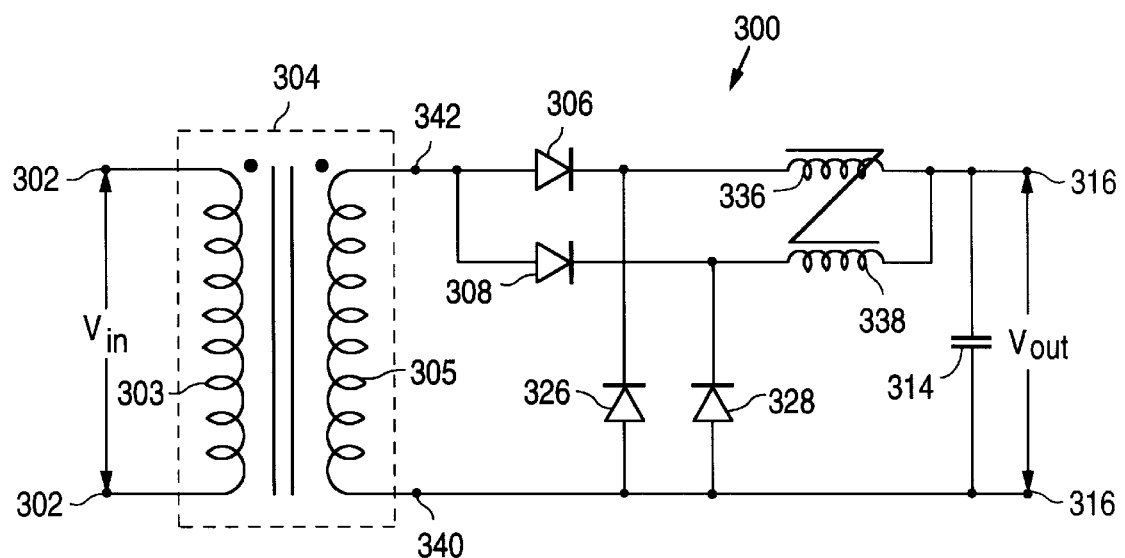
FIG. 8 is a circuit schematic of an inventive forward converter.

FIG. 8 shows a forward converter using the current sharing approach of the present invention. In forward converter 300, input voltage $V_{in}$ is input into transformer 304 at input terminals 302, which drive primary winding 303 of transformer 304. The output of transformer 304 from first and second input terminals 342, 340 of secondary winding 305 is coupled through secondary forward diodes 306, 308, inductors 336 and 338, and output capacitor 314 to output terminals 316. The voltage across output terminals 316 is the output voltage $V_{out}$ of forward converter 300. Inductor 336 is coupled to secondary forward diode 306 and freewheeling diode 326, while inductor 338 is coupled to secondary forward diode 308 and freewheeling diode 328. Thus each set of a freewheeling diode and a secondary forward diode is coupled to a separate inductor. In a preferred embodiment of the forward converter of the present invention, inductors 336 and 338 are wound around the same magnetic core, as shown in FIG. 8.

One reason why current sharing occurs in the inventive forward converter of FIG. 8 is that the inductances of inductive elements 336 and 338 are substantially equal and the characteristics of secondary forward diodes 306, 308 and freewheeling diodes 326, 328 are selected to be nominally identical. However, another reason why there is substantially equal current sharing is that the impedance of inductive element 336, including its associated electrical resistance, makes the current flowing through diode 306 largely insensitive to manufacturing variances in diode 306. Similarly the impedance of inductive element 338, including its associated electrical resistance, makes the current flowing through diode 308 largely insensitive to manufacturing variances in diodes 308. Thus, the parallel arrangement of power devices in the forward converter of FIG. 8 achieves substantially equal current sharing despite variances in the nominal characteristics of secondary diodes 306, 308 and freewheeling diodes 326, 328.

The physical principles underlying the current sharing mechanism of the present invention may be illustrated with reference to the boost converter power supply 400 shown in FIG. 9. In boost converter 400, input voltage $V_{in}$ is input into terminal 402, 404. First inductive element 436 is coupled to first diode 426 and first FET switch 440, while second inductive element 438 is coupled to second diode 428 and second FET switch 442. Additional gate resistors $R_{G1}$ and $R_{G2}$ are coupled to each gate to reduce the potential for deleterious oscillations. A pulse source 406 provides substantially identical gate control pulses to power switches 440, 442. The output of diodes 426, 428 drives the load, $R_L$. An additional filter capacitor 414 smooths the voltage across load terminals 416, 418.

The two inductive elements 436, 438 are preferably each inductors wound around the same magnetic core. Thus, as indicated in FIG. 9, inductive elements 436, 438 can be modeled as forming an equivalent transformer, $T_1$, with a unity turns ratio. If both FET switches, 440, 442 are off, the circuit functions as shown in FIG. 10, namely that of first inductive element 436 coupled to first diode 426 in parallel with second inductive element 438 coupled to second diode 428.

Figure 10:
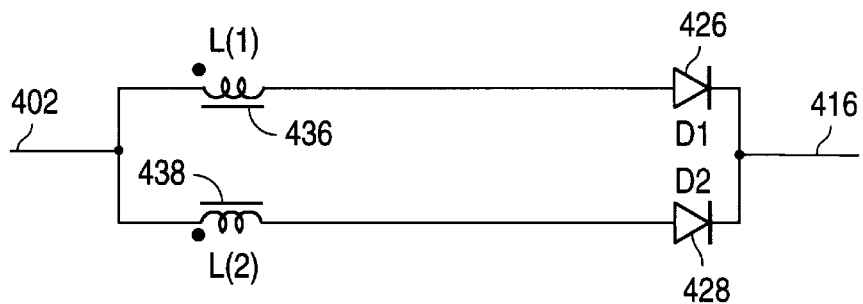
FIG. 10 is an equivalent circuit of the boost converter of FIG. 9 with both switches off.
Figure 11:
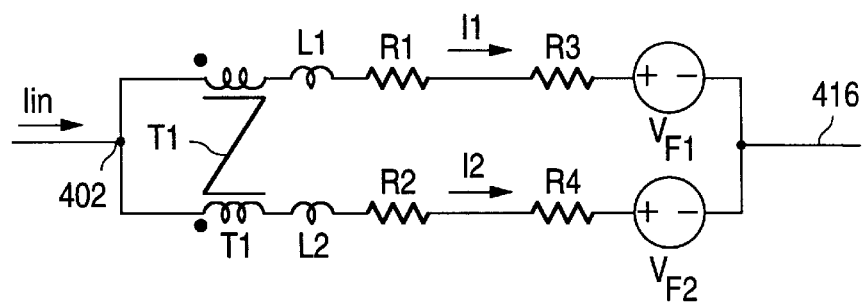
FIG. 11 is an equivalent linear circuit for the boost converter of FIG. 10.

The equivalent circuit of the circuit of FIG. 10 is shown in FIG. 11. Each inductive element 436, 438 has an associated inductance and resistance. Since inductive elements 436, 438 are inductors wound around a common magnetic transformer core, they have a common mutual inductance. First inductive element 436 also has an uncoupled inductance $L_1$ and resistance $R_1$ and second inductive element 438 also has an uncoupled inductance $L_2$ and resistance $R_2$. In a simple transformer model, these uncoupled inductances are the leakage inductances of the transformer windings formed by winding the two inductors on a common magnetic core. In a linear approximation, each diode 426, 428 may be modeled as having an equivalent large current resistance and turn-on voltage. Consequently, first diode 426 is modeled as having a series resistance $R_3$ and a turn-on voltage $V_{f1}$ while second diode 428 is modeled as having a series resistance $R_4$ and a turn-on voltage $V_{f2}$.

Figure 1:
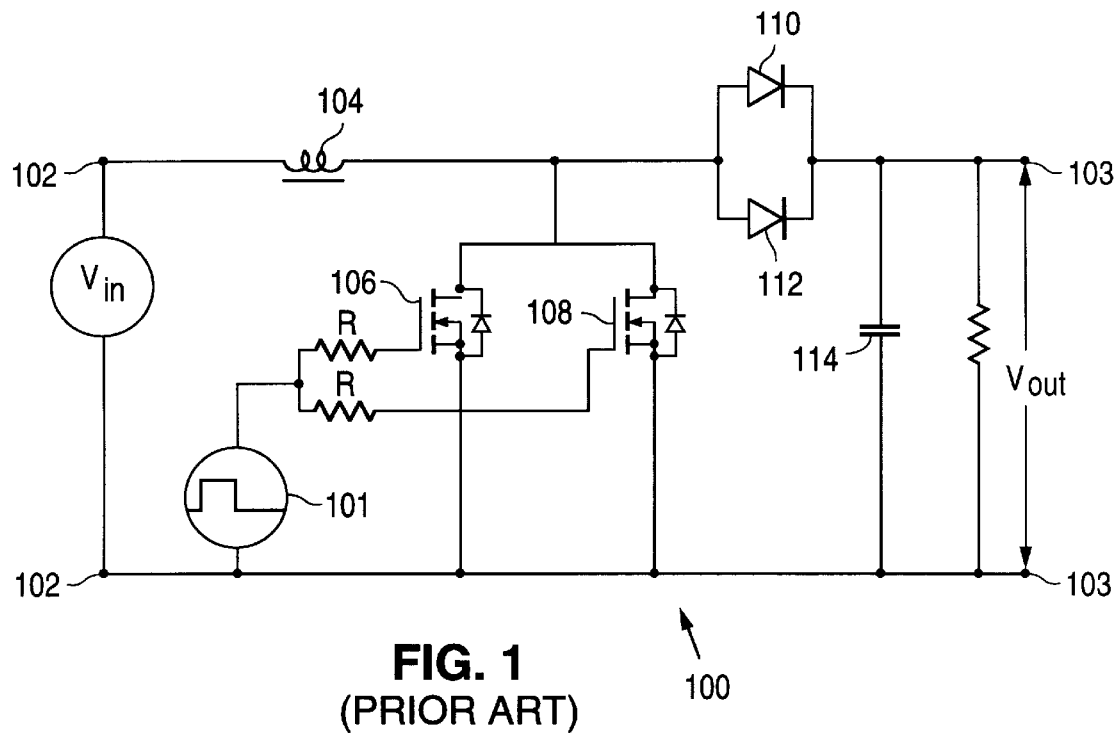
FIG. 1 is a schematic circuit diagram of a prior art boost power converter using parallel power devices to handle the high current and power dissipation that would exceed the safety ratings of a single power device.
Figure 2:
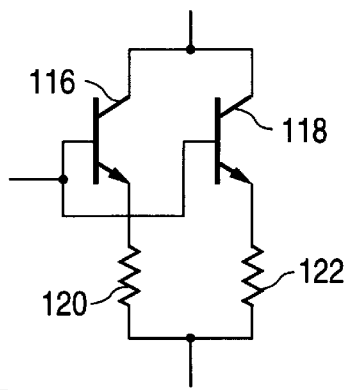
FIG. 2 is a schematic circuit diagram of a prior art parallel bipolar switch circuit.
Figure 3:
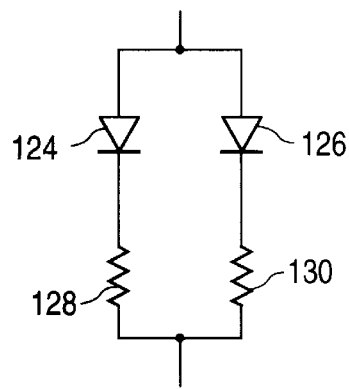
FIG. 3 is a schematic circuit diagram of a prior art parallel rectifier circuit.
Figure 4:
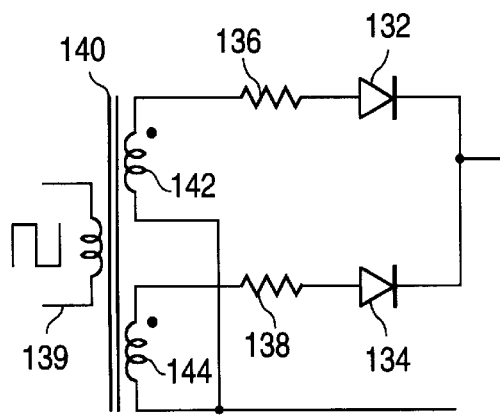
FIG. 4 is a schematic circuit diagram of a second prior art parallel rectifier circuit.
Figure 9:
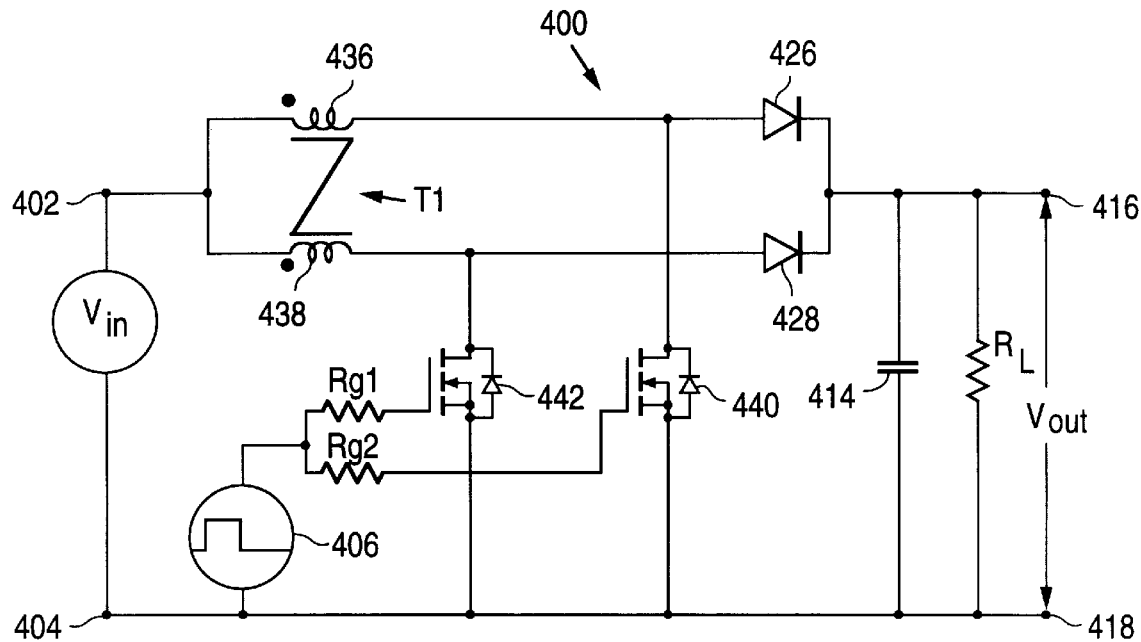
FIG. 9 is a circuit schematic an embodiment of an inventive boost converter with parallel diodes and parallel switches.

As an illustrative example of the benefits of the inventive current sharing circuit, the inventors have performed a comparison calculation of the inventive circuit of FIG. 9 and the prior art current sharing approach of FIG. 1. In both calculations, it was assumed that the diodes were Harris RHRP680 8A, 600V Hyperfast rectifiers. The input voltage was assumed to be 200 Volts with a corresponding output voltage of 400 volts, a load current of 2 amps, a switch duty cycle of 50%, an output power of 800 Watts, and an input current of 4 amps. The measured current-voltage characteristics of the rectifier was used to calculate the equivalent turn-on voltage and series (slope) resistance. At one-hundred degrees Celsius, the nominal turn-on voltage is 0.75 volts and the slope resistance at a current of two Amps is 0.12 Ohms. For these conditions, a variation of ±5% in the equivalent resistance and forward turn-on voltage of the rectifiers in FIG. 1 can produce a ±22% difference in the current drawn by each rectifier at a constant rectifier temperature. The rectifier drawing the larger current dissipated 55% more power compared to the other rectifier.

However, the inventive circuit of FIG. 9 produces a substantially equal current $I_1$, and $I_2$ flowing through the parallel rectifiers 426, 428 even though the rectifiers 426, 428 comprise the same Harris RHRP680 8A, 600V Hyperfast rectifiers with a manufacturing variance of ±5% for both forward voltage and slope resistance. As in the previous example, the same input and load currents, voltages, and duty cycle is assumed. However, the equivalent resistance of the inductors, $R_1$ and $R_2$, substantially moderates the variation in diode characteristics, particularly if the nominal value of the inductor resistance is greater than the slope resistance of the rectifiers 426, 428. The inductive elements 436, 438 are assumed to be inductors that have an inductance similar to those used in similar boost converters, which have an equivalent resistance of 0.2 ohms. First diode 426 has a forward voltage of 0.71 volts and equivalent resistance of 0.114 ohms whereas second diode 428 has a forward voltage of 0.79 volts and an equivalent resistance of 0.126 ohms. According to well-known principles, the voltage across the nodes 402, 416 must be the same regardless of whether the voltage is calculated in the top or bottom path. This can be expressed mathematically as $V=I_1(0.2+0.114)+0.71=I_2(0.2+0.126)+0.79$. If we assume a total current $I_1+I_2$ of four Amps, then $I_1=2.16A$ and $I_2=1.84A$. This corresponds to a ±8% variation in diode current and a 10% difference in the power dissipated from the first diode compared to the second diode. The resistance of the inductance windings moderates the effect of the manufacturing variance on rectifier current by about a factor of 2.8 compared to the prior art circuit of FIG. 1. Moreover, the resistance of the inductive windings moderates the effect of manufacturing variance on power dissipation by about a factor 5.5 compared to the prior art circuit of FIG. 1.

The present invention also produces substantially equal switching losses. For the case where inductive elements 436, 438 of the boost converter of FIG. 9 are not magnetically coupled to each other, each parallel circuit element functions substantially independently. In one embodiment, each inductive element is a substantially isolated inductor with no significant magnetic coupling to other inductors. As a separate inductor is coupled to each of the power switches 440, 442, the power switches are not coupled in parallel. Therefore, the turn-on loss is not carried by only one power switch, i.e., the fastest power switch. Similarly, the turn-off loss is not carried by only the slowest power switch. Instead, power switches 440, 442 have substantially equal turn-on and turn-off losses.

Figure 12:
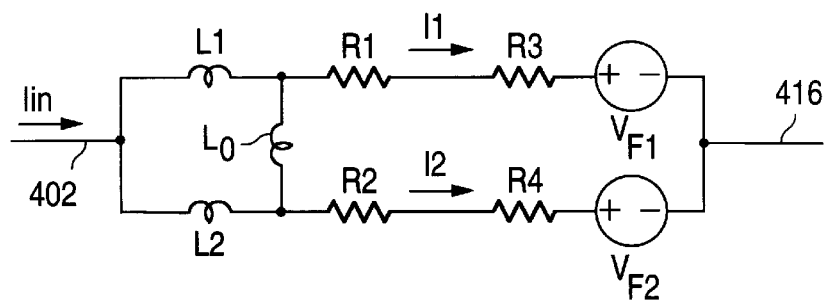
FIG. 12 is an alternate equivalent linear circuit for the boost converter of FIG. 10.
Figure 13:
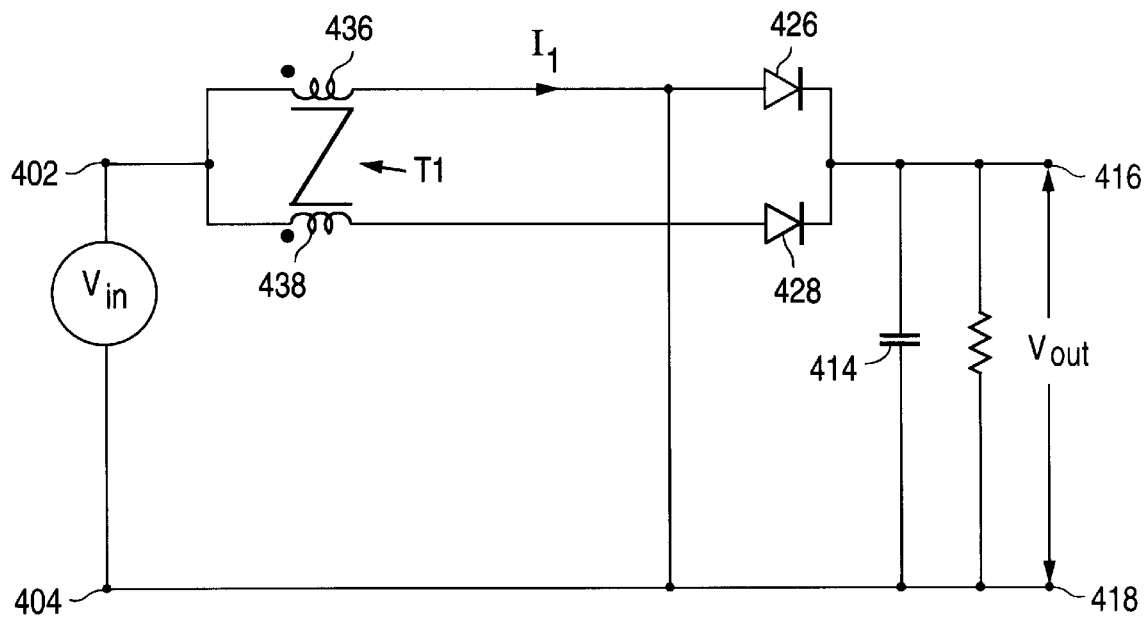
FIG. 13 is an equivalent circuit of the boost converter of FIG. 9 with one of the two switches in a conductive state.

It is also possible to achieve substantially equal switching losses in the preferred embodiment of the voltage boost circuit of FIG. 9 in which the inductive elements 436, 438 are inductors wound around the same magnetic core so that the inductors 436, 438 are magnetically coupled to each other. As shown in FIG. 11 and as mentioned above, inductive elements 436, 438 comprised of inductors wound around a common magnetic core can be modeled as an ideal transformer $T_1$ plus un-coupled inductances $L_1$ and $L_2$. Alternately, as shown in FIG. 12, the magnetic coupling between inductors 436, 438 can be modeled as an inductance $L_0$ that couples inductors $L_1$ and $L_2$. The transformer action $T_1$ can be ignored in quasi-steady state when $I_1$ and $I_2$ are approximately equal. However, for the case that manufacturing variance in switches 440, 442 causes the transistors to switch slightly out of phase with respect to each other, the transformer action cannot be ignored. If the first switch 440 turns on before the second switch 442, then it shunts current from first diode 426. This is shown in FIG. 13. Also, if first switch 440 switches on before second switch 442, it also acts to shunt current from the path of second diode 428 because of the transformer action coupling first inductor 436 to second inductor 438. That is, the transformer facilitates a transfer of stored energy from second inductor 438 to first inductor 436 as inductor 436 is discharged by first switch 440. This is normally undesirable because it leads to unequal current sharing and unequal switching losses between the switches 440, 442 and thus may require the use of FETs with higher current ratings compared to the case of in-phase switching. However, the inventors have recognized that inductors 436, 438 may be selected to render the circuit insensitive to slight variations in switch 440, 442 turn-off and turn-off characteristics. If, as in FIG. 13, one of the switches 440, 442 turns on before the other one, the output voltage is supplied across both inductors, $L_1$ and $L_2$. A comparatively large value of the inductance of inductors 436, 438 helps to maintain substantially equal current sharing of switches 440, 442 even for the case that one of the switches turns on/off ahead of the other switch. The inductance associated with inductors 436, 438 limits the rate of change of current associated with the transformer $T_1$ during a small time interval, $\Delta t_p$, where $\Delta t_p$ corresponds to the phase delay in the turn-on and turn-off responses of switches 440, 442. The rate of change of current transfer between the current $I_1$ and $I_2$ will, to first order, depend upon the output voltage, $V_{out}$, divided by the sum of the inductances in both inductors 436, 438. A useful criteria for the transfer of current to be small compared to the load current is that the value of the sum of the inductances of inductors 436, 438 is equal to the load voltage $V_{out}$ divided by the load current I multiplied by $\Delta t_p$. This may be expressed mathematically as:

$$(L_1 + L_2) = \Delta t_p \frac{V_{out}}{I}$$

In summary, the current sharing circuit of the present invention achieves the benefit of substantially equal current sharing. One aspect of the current sharing circuit of the present invention is that each parallel circuit leg includes an inductor coupled to one or more power devices, such as a diode rectifier or switch which have the same nominal circuit parameters. Another aspect of the current sharing circuit of the present invention is that the series resistance of the inductor beneficially reduces the effects of manufacturing variances and thermal effect upon diodes and switches connected in series to the inductor.

While the present invention has been particularly described with respect. to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A current sharing circuit element for use in a power supply, comprising:
    a first voltage terminal;
    a second voltage terminal;
    N inductive elements having first and second terminals, where N is an integer greater than one; the first terminal of each of said N inductive elements connected to said first voltage terminal, each of said N inductive elements having a substantially similar impedance; and
    a first set of N power devices selected from the group consisting of switches and rectifiers, each of said N power devices coupled between a respective one of said second terminals of a corresponding one of said N inductive elements and said second voltage terminal, each of said first set of N power devices having a conductive mode with substantially similar electrical characteristics;
    wherein said set of N power devices are operated in phase and wherein the resistance of each said inductive element is greater than the resistance of each said power device in its conductive mode, thereby improving current sharing.

2. The current sharing circuit of claim 1, further comprising a second set of N power devices, each said second power device coupling a respective one of said second terminals of a corresponding one of said N inductive elements to a common electrical ground.

3. The current sharing circuit of claim 2, wherein each of the power devices of said second set of N power devices has substantially similar electrical characteristics in a conducting mode.

4. A current sharing circuit comprising:
    first and second input voltage terminals;
    first and second output voltage terminals;
    N inductive elements having first and second terminals, where N is an integer greater than one; the first terminal of each of said N inductive elements connected to said first input voltage terminal, each of said N inductive elements having a substantially similar impedance;
    a first set of N power devices selected from the group consisting of rectifiers and switches, each device of said first set of N power devices coupled between a respective one of said second terminals of a corresponding one of said N inductive elements and said first output voltage terminal, each of said first set of N power devices having substantially similar electrical characteristics;
    a second set of N power devices selected from the group consisting of rectifiers and switches, each device of said second set of N power devices coupled between a respective one of said second terminals of a corresponding one of said N inductive elements and said second output voltage terminal, each of said second set of N power devices having substantially similar electrical characteristics; and
    means for coupling said second input voltage terminal to said second output voltage terminal;
    wherein said first set of N power devices are operated in phase and said second set of N power devices are operated in phase, and
    further wherein the resistance of each said inductive element is greater than the resistance of each said power device in its conductive mode, thereby improving current sharing.

5. The current sharing circuit of claim 4, further comprising a magnetic core, wherein said N inductive elements are wound around said magnetic core.

6. The current sharing circuit of claim 4, wherein said first set of N power devices comprises a first set of N rectifiers.

7. The current sharing circuit of claim 4, wherein said second set of N power devices comprises a second set of N rectifiers.

8. The current sharing circuit of claim 4, wherein said second set of N power devices comprises N power switches.

9. A boost voltage converter, comprising:

first and second input voltage terminals;

first and second output voltage terminals;

N inductive elements having first and second terminals, where N is an integer greater than one; the first terminal of each of said N inductive elements connected to said first input voltage terminal, each of said N inductive elements having a substantially similar impedance;

a set of N power rectifiers each coupled between a respective one of said second terminals of a corresponding one of said N inductive elements and said first output voltage terminal, each of said set of N power rectifiers having substantially similar electrical characteristics;

a set of N power field effect transistor switches each coupled between a respective one of said second terminals of a corresponding one of said N inductive elements and said second output voltage terminal, each of said set of N field effect transistor switches having substantially similar electrical characteristics; and means for coupling said second input voltage terminal to said second output voltage terminal;

wherein said set of N power field effect transistor switches are operated substantially in phase and wherein the resistance of each said inductive element is greater than the resistance of each said power rectifier in its conductive mode, thereby improving current sharing.

10. The boost converter of claim 9, wherein N=2.

11. The boost converter of claim 10, wherein said inductive elements are magnetically coupled and the sum of the uncoupled inductances of said inductive elements is substantially greater than the phase delay time interval in the response of said first switch and said second switch multiplied by the peak load voltage divided by the peak load current.

12. A forward converter comprising:

a transformer, said transformer including a primary winding and a secondary winding, said secondary winding having a first and second secondary winding terminals;

first and second output voltage terminals;

N inductive elements having first and second terminals, where N is an integer greater than one; wherein said second terminal of each said inductive element is coupled to said first output terminal;

a first set of N power rectifiers each coupled between a respective one of said first terminals of a corresponding one of said N inductive elements and said first secondary winding terminal, each of said first set of N power rectifiers having substantially similar electrical characteristics;

a second set of N free-wheeling diodes each coupled between a respective one of said first terminals of a corresponding one of said N inductive elements and said second output voltage terminal, each of said second set of N free-wheeling diodes having substantially similar electrical characteristics; and means for coupling said second secondary winding terminal to said second output voltage terminal;

wherein the resistance of each said inductive element is greater than the resistance of each said power rectifier in its conductive mode, thereby improving current sharing.

13. The forward converter of claim 12, wherein N=2.

* * * * *